US010993787B2

(12) United States Patent
Fischler et al.

(10) Patent No.: US 10,993,787 B2
(45) Date of Patent: May 4, 2021

(54) SYSTEM FOR CONNECTING A DENTAL RESTORATION TO A DENTAL IMPLANT

(71) Applicant: VALOC AG, Rheinfelden (CH)

(72) Inventors: Titus Fischler, Zeiningen (CH); Felix Fischler, Basel (CH)

(73) Assignee: VALOC AG, Rheinfelden (CH)

(*) Notice: Subject to any disclaimer, the term of this patent is extended or adjusted under 35 U.S.C. 154(b) by 67 days.

(21) Appl. No.: 16/336,569

(22) PCT Filed: Sep. 26, 2017

(86) PCT No.: PCT/EP2017/074376
§ 371 (c)(1),
(2) Date: Mar. 26, 2019

(87) PCT Pub. No.: WO2018/060194
PCT Pub. Date: Apr. 5, 2018

(65) Prior Publication Data
US 2020/0015940 A1   Jan. 16, 2020

(30) Foreign Application Priority Data

Sep. 27, 2016  (EP) .................................... 16190771

(51) Int. Cl.
*A61C 8/00* (2006.01)
*A61C 13/30* (2006.01)

(52) U.S. Cl.
CPC .......... *A61C 8/0068* (2013.01); *A61C 8/0065* (2013.01); *A61C 13/30* (2013.01)

(58) Field of Classification Search
CPC ..... A61C 8/0068; A61C 8/0065; A61C 13/30; A61C 8/0069
See application file for complete search history.

(56) References Cited

U.S. PATENT DOCUMENTS

| 5,015,186 A | * | 5/1991 | Detsch ................ A61C 8/0001 |
| | | | 433/173 |
| 5,064,373 A | * | 11/1991 | Staubli ................ A61C 8/0048 |
| | | | 433/173 |

(Continued)

FOREIGN PATENT DOCUMENTS

| KR | 2016 0051482 A | 5/2016 |
| WO | 02/053055 A1 | 7/2002 |

(Continued)

OTHER PUBLICATIONS

International Search Report and Written Opinion dated Dec. 13, 2017 in corresponding International Patent Application No. PCT/EP2017/074376.

(Continued)

*Primary Examiner* — Nicholas D Lucchesi
(74) *Attorney, Agent, or Firm* — Medler Ferro Woodhouse & Mills PLLC (57) ABSTRACT

An abutment arrangement for connecting a dental restoration to a dental implant, including a post body and a screw element. The post body has an expansion part and the screw element includes a spreading section. The passage extends through the expansion part of the post body. An outer diameter of the expansion part of the post body is elastically increasable by applying a lateral force. The passage of the post body has a pressure receiving section at the expansion part. When the screw element is located in the passage of the post body, the spreading section of the screw element is arrangeable at the pressure receiving section of the passage of the post body such that the lateral force is applied to the expansion part of the post body and the outer diameter of the expansion part of the post body is increased.

18 Claims, 6 Drawing Sheets

(56) References Cited

U.S. PATENT DOCUMENTS

| | | | | |
|---|---|---|---|---|
| 5,302,125 | A | * | 4/1994 | Kownacki ............ A61C 8/0048 |
| | | | | 433/172 |
| 5,328,371 | A | * | 7/1994 | Hund ..................... A61C 8/005 |
| | | | | 433/173 |
| 5,885,078 | A | * | 3/1999 | Cagna ................ A61C 13/0003 |
| | | | | 433/172 |
| 6,190,169 | B1 | * | 2/2001 | Bluemli ............. A61C 13/2656 |
| | | | | 433/172 |
| 7,175,434 | B2 | | 2/2007 | Brajnovic |
| 8,651,858 | B2 | * | 2/2014 | Berckmans, III .... A61C 9/0006 |
| | | | | 433/24 |
| 8,777,612 | B2 | * | 7/2014 | Suttin .................. A61C 8/0089 |
| | | | | 433/72 |
| 8,944,816 | B2 | * | 2/2015 | Robb .................... A61C 8/0048 |
| | | | | 433/172 |
| 8,951,042 | B2 | * | 2/2015 | Buchegger ........... A61C 8/0068 |
| | | | | 433/173 |
| 2004/0063062 | A1 | * | 4/2004 | Brajnovic ............ A61C 8/0001 |
| | | | | 433/75 |
| 2012/0202173 | A1 | | 8/2012 | Seo et al. |

FOREIGN PATENT DOCUMENTS

| | | |
|---|---|---|
| WO | 2005/060862 A1 | 7/2005 |
| WO | 2008/077443 A1 | 7/2008 |

OTHER PUBLICATIONS

Extended European Search Report issued in European Application No. 16190771, dated Jul. 19, 2017.

\* cited by examiner

SYSTEM FOR CONNECTING A DENTAL RESTORATION TO A DENTAL IMPLANT

TECHNICAL FIELD

The present invention relates to an abutment arrangement according to the preamble of independent claim 1 and more particularly to a dental restoration assembly having such an abutment arrangement and a method of connecting a dental restoration to a dental implant.

BACKGROUND ART

For dental restoration, often damaged or lost teeth are replaced by artificial teeth which comprise dental restorations such as bridges, crowns or the like. Thereby, the dental restorations are placed either on remainders of original teeth or on implants set as artificial roots into jaw bones. Known restorations usually are made of materials which meet specific requirements such as biocompatibility, robustness, longevity and the like. For example, in non-exposed sections of the mouth metal dental restorations, e.g. made of gold or zirconium, are often used. In sections of the mouth which are visible, usually other materials are preferred which optically better suit to the appearance of natural teeth. For example, ceramic materials, composite materials, fiber-reinforced composites or acrylic glasses (Polymethylmethacrylate— PMMA) are commonly used.

As mentioned, the materials of crows are typically chosen in consideration of the requirements for being used as teeth such aesthetic requirements, mechanical conditions and the like. However, for being directly placed on implants which are typically made of titanium or on remainders of original teeth these materials are often not suitable. Therefore, usually an intermediate structure is provided between the dental restoration and the implant or remainder. Widespread intermediate structures are bases or abutments which are cemented to the crowns or restorations. For example, for being connected to titanium implants often crowns are cemented and/or bonded to titanium bases which are then placed on and connected to the implant.

Typically, restorations are cemented on bases or abutments outside or inside the mouth by a dental technician or dentist. Thereby, specific adhesives are used as cements wherein many cements are mixed of plural components before being applied. The cemented bases and restorations are then connected to the implants or remainders in the mouth wherein the bases contact the implants or remainders. Often, the dental restoration together with the base is fixed to the implant by means of a screw axially projecting through the dental restoration and the base into the implant.

For cementing a dental restoration on a base, often a model is used. For that purpose, at least a portion of the mouth in which an implant is set for mounting the dental restoration is modelled by a dental technician or a dentist using known modelling techniques. However, even though such model based cementing allows for precisely cementing the restoration to the base and for providing sophisticated cemented restoration-base-structures it is comparably cumbersome.

For making the cementing process faster and cheaper many dental technicians or dentists do manually cement the dental restoration to the base. Thereby, often a screw hole of the base which typically has a hollow interior is closed by a piece of wax or an elastic plug such that no cement can enter the interior of the base. The elastic plug typically is adapted to the geometry of the base in order to allow a safe closing. However, considering that dental restorations and particularly bases usually are comparably small such manual cementing often provides results of reduced quality. For, example often the cement is not regularly or uniformly distributed between the crown and the base such that the connection is not consistently strong. Also, often the crown can manually not be precisely positioned or oriented such that a reduced comfort and a reduced usability may result. Furthermore, overdosed cement may escape the restoration-base-structure which can lead to inflammation of the gum or the like.

Therefore, there is a need for a system allowing for a precise, safe and cost efficient connection of a dental restoration to a dental implant.

DISCLOSURE OF THE INVENTION

According to the invention this need is settled by an abutment arrangement as it is defined by the features of independent claim 1, by a dental restoration assembly as it is defined by the features of independent claim 16, and by a method as it is defined by the features of independent claim 18. Preferred embodiments are subject of the dependent claims.

In one aspect, the invention relates to an abutment arrangement for connecting a dental restoration to a dental implant. The arrangement comprises a post body and a screw element. The post body has an axial passage with an apical aperture and an occlusal aperture. The passage of the post body is equipped with a head slot and a press section limiting the head slot. Advantageously, it is straight or has a straight axis extending from the apical aperture to the occlusal aperture. The screw element comprises a head section and a thread section axially distant from the head section. The term "axially distant" in this connection can relate to the two sections being offset from each other along a longitudinal extension of the screw element. In particular, the screw element advantageously is longitudinal and has an axis along which the two sections are offset from each other.

The screw element is arrangable in the passage of the post body such that the head section of the screw element is positioned in the head slot of the passage of the post body abutting the press section of the passage of the post body and such that the screw element extends through the occlusal opening of the passage of the post body out of the post body. Thereby, advantageously, the head section and the head slot are matingly shaped such that the head section fits into the head slot.

The post body has an expansion part and the screw element comprises a spreading section wherein the passage extends through the expansion part of the post body. An outer diameter of the expansion part of the post body is elastically increasable by applying a lateral force. In this connection the term "elastic" can relate to an arrangement allowing the expansion part to return to its initial state one the lateral force is no longer applied. Thereby, the expansion part can return to its initial state by its own, e.g. due to its intrinsic material characteristics, or actively moved by another part. The passage of the post body has a pressure receiving section at the expansion part. When the screw element is located in the passage of the post body, the spreading section of the screw element is arrangable at the pressure receiving section of the passage of the post body such that the lateral force is applied to the expansion part of the post body and the outer diameter of the expansion part of the post body is increased.

The term "dental restoration" as used herein can relate to a dental prosthesis typically being the outermost structure of one artificial tooth or plural artificial teeth. It can particularly be a crown or a bridge or the like. The dental restoration can cap or encircle the dental implant and form the visible portion of the artificial tooth or teeth and its chewing face(s). Advantageously, it has the shape of the tooth or teeth to be replaced by the restoration. Typically restorations such as crowns are made of a metal, a metal ceramic, a ceramic, zirconium, zirconium dioxide, polymethylmethacrylate (PMMA), a composite, a fiber-reinforced composite or another material having color and properties similar to natural teeth.

The term "dental implant" as used herein can relate to a surgical component that interfaces with the bone of the jaw or skull to support the dental restoration. It can act as an orthodontic anchor or being an artificial tooth root. Dental implants are also known as an endosseous implants or fixtures in the art. Typically dental implants are placed in a hole in a bone structure where they are fixed or grown in by a biologic process called osseointegration. Thereby, the dental implants or more particularly their materials, such as titanium, form an intimate bond to the bone. For osseointegration a variable amount of healing time is required before either the dental restoration is attached directly or via an abutment.

The term "abutment" or "base" as used herein can relate to a substructure or intermediate structure to be integrated in the dental restoration for being mounted to the dental implant. The abutment or base can be adapted to align and hold the restoration. It can particularly be quasi cup shaped having a cylindrical or conical section and an implant face section.

The term "axial" as used herein can relate to an axis of the abutment arrangement or of other parts thereof. Thereby, the axis of the screw element can be identical to the axis of the post body when the screw element is arranged in the post body as intended. This axis can particularly essentially correspond to an axis of the tooth to be replaced or fixed. When being applied in the mouth, the axial passage, thus, can extend from an occlusal surface of the restoration to the dental implant.

The term "occlusal" as used herein can relate to a direction essentially towards a biting surface of the artificial tooth in an intended application. Thereby, the artificial tooth can particularly comprise the restoration, the post body of the abutment arrangement and the dental implant. Correspondingly, the term "apical" can relate to a direction towards a root of the tooth which is intended to be replaced or fixed. Occlusal and apical directions can be opposite.

The term "lateral" as used herein can relate to a direction essentially perpendicular to an occlusal direction or an axial direction. In an arrangement of the post body being essentially circular symmetric around its axis lateral can correspond to radial.

The term "lateral force" as used herein can relate to a force acting in a lateral, outward or radial direction of the abutment arrangement. It can be a lateral portion of a force having other portions as well. For example, it can be the lateral portion of a force transversally applied and having an axial portion and a lateral portion. The force can be applied or applicable to the expansion portion of the post body by pressing a specific section of it such as by pressing a section of an inner wall defining the passage, i.e. its pressure receiving section. The pressure receiving section of the passage can particularly be arranged to receive a lateral force or a force having a radial component. The lateral force can also be indirectly applied to the expansion part, e.g., by directly applying a force to another section of the post body from where it is transferred to the expansion part.

The term "outer diameter" as used in connection with the expansion part of the post body can relate to the outer boundary of the expansion part in any line of a plane perpendicular to the axial direction of the post body. By the outer diameter being increased, or in other words, a cross section perpendicular to an axis of the post body being increased, the expansion part is expanded. The expansion part can also have sections where it is non-expandable, i.e. its outer diameter cannot be increased. In particular, such non-expandable sections can be axially offset from the expandable sections. For being expandable in the sense of the invention it is sufficient if the outer diameter of the expansion part can be increased at one single section of the expansion part. However, the expansion of the outer diameter has to be appropriate to establish a connection between the post body and the dental restoration. A minor expansion which, e.g., is given within all material if a sufficient force is applied does not qualify as expansion in the sense of the invention as long as it is not appropriate to connect the dental restoration to the post body.

The expansion part of the post body can form an occlusal end of the post body. Thereby, the occlusal aperture of the passage of the post body can be located in the expansion part.

In use of the abutment arrangement according to the invention the screw element can have multiple effects or functions when being screwed into the implant. On one hand, by abutting the press section of the passage of the post body, it can press the post body onto the dental implant. Like this, the post body can be firmly secured to the implant. On the other hand, by the spreading section of the screw element being arranged at the pressure receiving section of the passage of the post body which leads to the lateral force being applied to the expansion part of the post body, the screw element expands the post body at its expansion part. In particular, the expansion part can be expanded into a corresponding recess or cavity provided in the dental restoration. Thereby, the dental restoration can be firmly connected to the post body.

The abutment arrangement according to the invention allows for securing the post body to the implant and to connecting the dental restoration to it by simply screwing the screw element in the implant. Thereby, no cementing is necessary. This allows for making the restoration process essentially faster and more efficient. Also no inflammations caused by cement may occur once the dental restoration is fixed since no cement is involved. Thus the abutment arrangement allows for a completely cement free connection of the dental restoration to the jaw.

Furthermore, by the outer diameter of the expansion part being elastically increasable, the abutment arrangement according to the invention allows for a reversible mounting of the dental restoration. In particular, by simply unscrewing the screw element from the implant, due to its elasticity, the outer diameter of the expansion part is automatically decreased again such that the dental restoration can be released and taken off the post body. This allows for an efficient replacement of the dental restoration such that, e.g., the dental restoration can be tried out in use and replaced or further adapted if desired.

Thus, the abutment arrangement according to the invention allows for a precise, safe and cost efficient connection of the dental restoration to the dental implant.

Advantageously, the screw element is shaped such that the post body is at least slightly pressed to the implant before expansion of the expansion part starts. This allows for holding the post body at its target position before finally connecting the dental restoration to the post body. Thereby, the dental restoration can finally be positioned in a precise manner when the post body is in its final position already.

For a beneficial separation of the two functions of (i) firmly securing the post body to the dental implant and of (ii) firmly connecting the post body to the dental restoration, the pressure receiving section of the passage of the post body preferably is separate and axially distant from the press section of the passage of the post body. In particular, the pressure receiving section can be distant form the press section in an occlusal direction. Thus, the press section can be arranged closer to or even at an apical end of the post body and the pressure receiving section closer to or even at an occlusal end of the post body.

In correspondence with such an arrangement of the post body, the head section of the screw element can have a push portion abutting the press section of the passage of the post body when the screw element is arranged in the passage of the post body. The push portion of the head section of the screw element preferably is separate and axially distant from the spreading section of the screw element.

Thereby, the conical push portion of the head section of the screw element preferably is conical tapering towards the thread section of the screw element. Such a conical push portion allows the head section to efficiently apply a pressure force towards the dental implant when the screw element is screwed to the implant as intended. Thereby, the press section of the passage of the post body preferably is conical corresponding to the push portion of the head section of the of the screw element. The press section allows for efficiently receiving the pressure force from the push portion such that the post body is increasingly fixed to the dental implant when the screw element extends through the passage and is screwed into the implant. In particular, mainly an axial portion of the pressure force acting from the push portion to the press section presses the post body on the implant such that the post body is firmly fixed to the implant.

Preferably, the expansion part of the post body comprises flexible lamellas. In this context, the term "flexible" can relate to the lamellas being bendable, movable or deformable. The lamellas can particularly extend essentially in an axial direction. The expansion part can have a section with a fixed diameter such as, e.g., a ring section from which the lamellas quasi axially extend. Such flexible lamellas can efficiently be bent in an outward, lateral or radial direction by the lateral force, e.g., acting on an interior side of the lamellas. At their outer surface or outer side the lamellas can be provided with convex bulge which allows for efficiently engaging into a corresponding cavity or recess of the dental restoration. Thereby, the post body can firmly be connected to the dental restoration when its expansion part is expanded.

The expansion part of the post body preferably comprises blind sections arranged between the flexible lamellas. By having the blind sections in between the lamellas the expansion part can extend about its complete circumference. In particular, the blind sections allow for covering the complete circumference in any status of the lamellas, for example also when the lamellas are outwardly displaced or bent. This makes it possible to prevent that the interior of the post body, in use particularly the screw element, may shine through.

Preferably, the spreading section of the screw element is conical and tapers towards the thread section of the screw element. Such a conical spreading section allows the screw element to efficiently apply the lateral force towards the expansion part when the screw element is screwed into the implant as intended. Like this, the outer diameter of the expansion part can efficiently be extended which secures the dental restoration to the post body. Thereby, the pressure receiving section of the passage of the post body preferably is conical corresponding to the spreading section of the of the screw element. Such pressure receiving section allows for efficiently receiving the lateral force from the spreading section such that the outer diameter of the expansion portion can efficiently be increased. In particular, mainly a lateral or radial portion of the force acting from the spreading section to the pressure receiving section pushes the expansion part outwardly such that its outer diameter or its cross section is increased.

In one preferred embodiment, the post body is a single piece device which can be made of one single material.

In another preferred embodiment, the post body has a base part adjacent to the expansion part, the passage extends through the base part of the post body, the base part of the post body is made of a first material having properties adjusted for an efficient connection of the post body to the dental implant, and the expansions part of the post body is made of a second material having properties adjusted for an efficient connection of the post body to the dental restoration. The first material and the second material particularly are different materials. By providing different materials in the expansion part and the base part of the post body it can be achieved that both parts can have appropriate specific properties. For example, in the expansion part it is essential that the material allows for being efficiently bent or displaced in a lateral direction. Such flexibility may be disadvantageous in the base part. Thus, by providing the base part in another material the base has suitable properties such as, e.g., rigidity or similar characteristics as the material of the dental implant. Specifically, the base part can be made in the same material as the dental implant. Thus, the two material composition of the post body allows it to efficiently and specifically perform its various functions, which can, e.g., be safe securing on the implant and flexible widening of the outer diameter.

Thereby, the first material of the base part of the post body preferably is titanium and/or the second material of the expansion part of the post body preferably is PEEK, PMMA, Polycarbonate, Nylon, Silicone or a combination thereof. The acronym PEEK relates to polyether ether ketone being an organic thermoplastic polymer of the polyaryletherketone (PAEK) family which is frequently used in engineering applications. Beyond others PEEK has a comparable good biocompatibility, can have a white color similar to teeth, is comparably rigid and still has a comparably high flexibility allowing for a good elastic deformation. The acronym PMMA relates to Poly(methyl methacrylate) which is also known as acrylic or acrylic glass. Titanium is widespreadly used in dental implants for various reasons such as good biocompatibility, efficient osseointegration and others. Therefore, by providing the base part in titanium the base part can firmly and matingly be secured on the implant. For esthetic reasons, the base part can be colored, e.g. in white or white-like, in order to make it less perceivable.

Preferably, the base part has a first connection structure and the expansion part has a second connection structure, wherein the post body is assembled by the first connection structure of the base part engaging the second connection structure of the expansion part. Such first and second connection structures allow for efficiently providing the post body in two materials. Thereby, the first connection structure of the base part preferably is a first snap-in formation and the second connection structure of the expansion part preferably is a second snap-in formation corresponding to the first snap-in formation of the base part. Such first and second snap-in formations allow for snapping the base part and the expansion part together. Like this, an efficient assembly of the post body made of two different materials can be achieved.

Preferably, the post body comprises a protrusion element dimensioned to releasable hold the dental restoration when being arranged onto the post body. With such a protrusion element the dental restoration can intermediately be held on the post body. Like this, a convenient and efficient handling can be achieved. In particular, when mounting the dental restoration such as a crown to the dental implant it can hold the post body via its protruding element by friction before fixing it to the implant such that the post body can be conveniently positioned at a correct location before screwing the screw element to the dental implant.

Thereby, the protrusion element preferably is formed at the expansion part of the post body. Such a protrusion element can be embodied in the same material as the expansions part or the lamellas. Thus, it can have an elasticity which allows for slightly clamping the dental restoration from the inside such that it is held by friction onto the post body.

For achieving a stable and safe intermediate connection between the post body and the dental restoration the post body can be equipped with plural respective protrusions which, advantageously, are regularly positioned on the post body.

The post body of the abutment arrangement can be equipped with a flange portion. Particular, such flange portion may be located near the occlusal end of the post body. Like this, an increased surface can be provided to contact a respective occlusal surface of the dental implant. This allows for distributing the forces such as a biting or chewing forces over a larger area which can reduce the wear of the post body and the implant where they are connected and to increase stability of the system.

A further aspect of the invention relates to a dental restoration assembly comprising an abutment arrangement as described above and a dental restoration having a cavity for receiving the post body of the abutment arrangement. Thereby, the cavity of the dental restoration is formed to allow the screw element of the abutment arrangement to increase the outer diameter of the expansion part of the post body such that the dental restoration is fixedly connected the post body of the abutment arrangement.

The cavity can particularly be a through bore allowing the screw element to be provided into the post body while the dental restoration is arranged on it. In particular, the through bore can have an axis with is identical to the axis of the abutment arrangement when the dental restoration is arranged on the post body as intended. In a sophisticated manner the dental restoration can be manufactured in a CAD/CAM process. Alternatively, it can be manufactured in a pressing process or a molding process or a combination thereof.

With such a dental restoration assembly the effects and advantages described above in connection with the abutment arrangement according to the invention and its embodiments can efficiently be achieved.

Preferably, the cavity of the dental restoration of the dental restoration assembly has a concave impression into which the expansion part of the post body is expandable and which prevents moving the dental restoration in relation to the post body of the abutment arrangement when the expansion part of the post body is expanded by the screw element of the abutment arrangement. The impression can be embodied as a bulge of the axial cross section of the cavity. It can extend around the complete circumference of the post body or at sections of the circumference only where expandable sections of the expansion part such as the lamellas are located. Such a concave impression allows for providing a safe connection between the post body and the dental restoration.

Another further aspect of the invention relates to a method of connecting a dental restoration to a dental implant. The method comprises: obtaining an abutment arrangement as described above; providing the dental restoration with a cavity formed to allow the screw element of the abutment arrangement to increase the outer diameter of the expansion part of the post body; imposing the post body of the abutment arrangement into the cavity of the dental restoration; setting the post body onto the dental implant; providing the screw element of the abutment arrangement through the cavity of the dental restoration and the passage of the post body of the abutment arrangement; securing the screw element to the dental implant whereby the head section of the screw element of the abutment arrangement abuts the press section of the passage of the post body of the abutment arrangement such that the post body of the abutment arrangement is pressed to the dental implant, and the expanding section of the screw element of the abutment arrangement provides an lateral force onto the expansion part of the post body of the abutment arrangement such that the outer diameter of the expansion part of the post body of the abutment arrangement is increased and the dental restoration is fixedly connected the post body of the abutment arrangement; and closing an occlusal opening of the cavity of the dental restoration.

Thereby, the passage can be closable by specific means in order dental restoration to have a proper surface when being mounted to the implant. For example, a suitable plug can be pressed into the passage after the restoration is mounted to the implant.

Such a method allows for efficiently connecting a dental restoration to a dental implant without requiring to use any cement. In particular, the method allows for efficiently achieving the effects and advantages described above in connection with the abutment arrangement and its embodiments.

BRIEF DESCRIPTION OF THE DRAWINGS

The abutment arrangement, the dental restoration assembly and the method according to the invention are described in more detail herein below by way of an exemplary embodiment and with reference to the attached drawings, in which.

DESCRIPTION OF EMBODIMENTS

In the following description certain terms are used for reasons of convenience and are not intended to limit the invention. The terms "right", "left", "up", "down", "under" and "above" refer to directions in the figures. The terminology comprises the explicitly mentioned terms as well as their derivations and terms with a similar meaning. Also, spatially relative terms, such as "beneath", "below", "lower", "above", "upper", "proximal", "distal", and the like, may be used to describe one element's or feature's relationship to another element or feature as illustrated in the figures. These spatially relative terms are intended to encompass different positions and orientations of the devices in use or operation in addition to the position and orientation shown in the figures. For example, if a device in the figures is turned over, elements described as "below" or "beneath" other elements or features would then be "above" or "over" the other elements or features. Thus, the exemplary term "below" can encompass both positions and orientations of above and below. The devices may be otherwise oriented (rotated 90 degrees or at other orientations), and the spatially relative descriptors used herein interpreted accordingly. Likewise, descriptions of movement along and around various axes includes various special device positions and orientations.

To avoid repetition in the figures and the descriptions of the various aspects and illustrative embodiments, it should be understood that many features are common to many aspects and embodiments. Omission of an aspect from a description or figure does not imply that the aspect is missing from embodiments that incorporate that aspect. Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for reason of lucidity, if in a drawing not all features of a part are provided with reference signs it is referred to other drawings showing the same part. Like numbers in two or more figures represent the same or similar elements.

Figure 1:
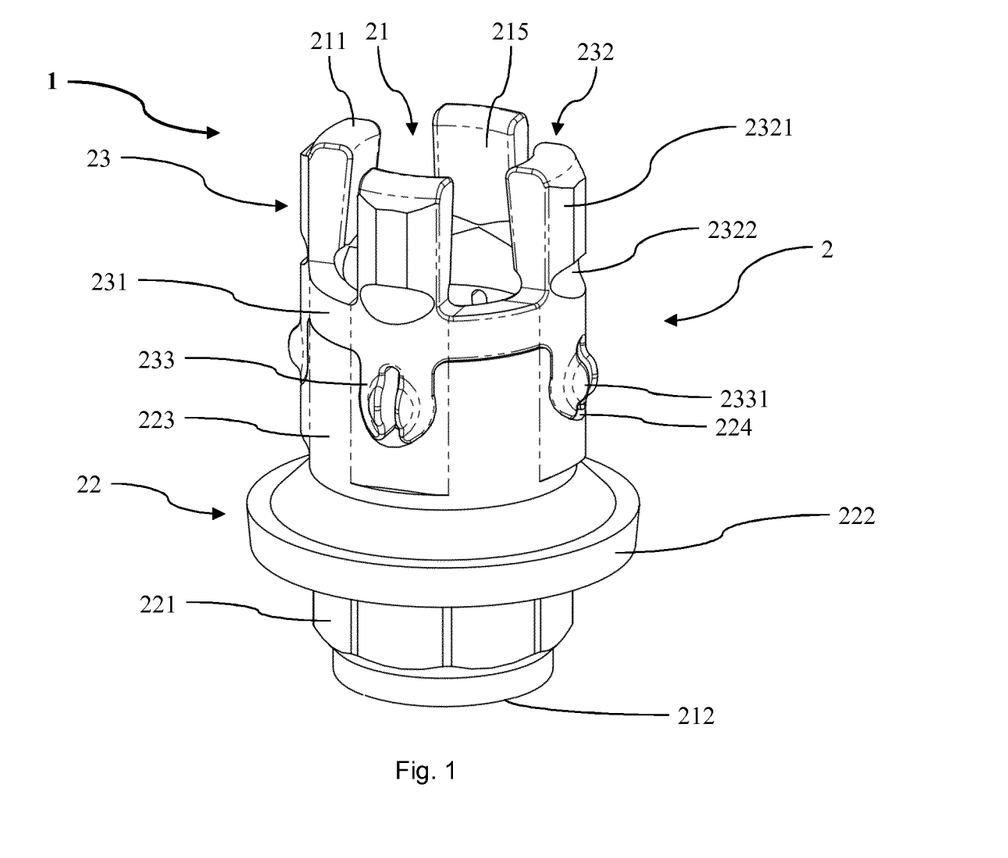
FIG. 1 shows a perspective view of a post body of an embodiment of an abutment arrangement according to the invention.

FIG. 1 shows a post body 2 of an embodiment of an abutment arrangement 1 according to the invention. The post body 2 consists of two pieces, i.e. an upper expansion part 23 and a lower base part 22. It further has a central passage 21 with an occlusal aperture 211 and an apical aperture 212. The passage 21 axially extends through the expansion part 23 and the base part 22. The expansion part 23 comprises a ring portion 231 from which four lamellas 232 axially extend in an upward direction. The lamellas 232 are regularly distributed around the circumference of the ring portion 231. Each lamella 232 comprises a bulge 2321 outwardly or radially extending and a notch 2322. The notches 2322 are located at lower ands of the lamellas 232. Since at the notches 2322 the thickness of the lamellas 232 is reduced they can conveniently be outwardly bent. The inner surfaces of the lamellas 232 form a pressure receiving section 215 of the passage 21.

Below each of the lamellas 232 a snap-in tongue 233 as a snap-in formation axially extends in a downward direction. Each snap-in tongue 233 has an axial slit dividing the snap-in tongue 233 in two parallel portions. From an outward surface of each snap-in tongue 233 a protrusion 2331 laterally extends.

The expansion part 23 is made of PEEK. The base part 22 is made of titanium and comprises a lower apical cylinder 221, an intermediate flange portion 222 and an upper occlusal cylinder 223. The occlusal cylinder 223 has four snap-in recesses 224 as snap-in formation located in correspondence with the snap-in tongues 233. Thereby, the snap-in recesses 224 are formed to receive the snap-in tongue 233 when the expansion part 23 is pressed top down onto the base part 22. In particular, the two parallel portions of each snap-in tongue 233 are elastically moved towards each other until they are arranged in the respective snap-in recess 224. There they are moved back in the initial position such that the base part 22 and the expansion part 23 are firmly connected.

Figure 2:
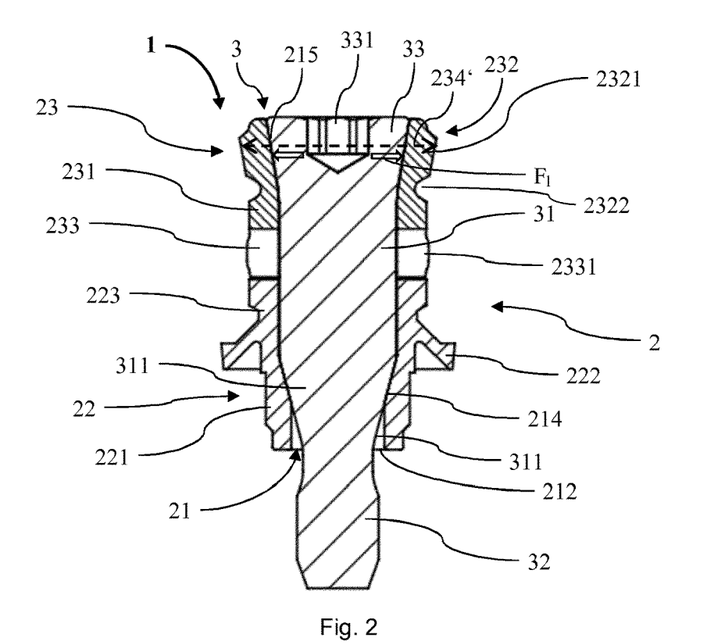
FIG. 2 shows a cross sectional view of the abutment arrangement shown in FIG. 1.

In FIG. 2 the abutment arrangement 1 is shown with its screw element 3 arranged inside the passage 21 of the post body 2. The screw element 3 comprises an upper conical spreading section 33 axially passing over in a head section 31 and a lower thread section 32 near an apical end of the screw element 3. The spreading section 33 axially tapers in a downward direction. At its top or occlusal end it comprises a driver recess 331 for accommodating a screw driver. Similarly as the spreading section 33 a lower portion of the head section 31 forms a conical push portion 311 which axially tapers in a downward direction.

The screw element 3 is completely pushed into the passage 21 of the post body 2. Thereby, the outer surface of the push portion 311 abuts the press section 214 of the passage 21. Similarly, the outer surface of the spreading section 33 abuts the pressure receiving section 215 of the passage 21 such that a lateral or radial force $F_1$ acts on the lamellas 232 of the expansion part 23. Thereby, the lamellas 232 are outwardly bent about the notches 2322 such that an outer diameter 234' of the expansion part 23 is increased. The expansion part 23 is in its expanded state.

Figure 3:
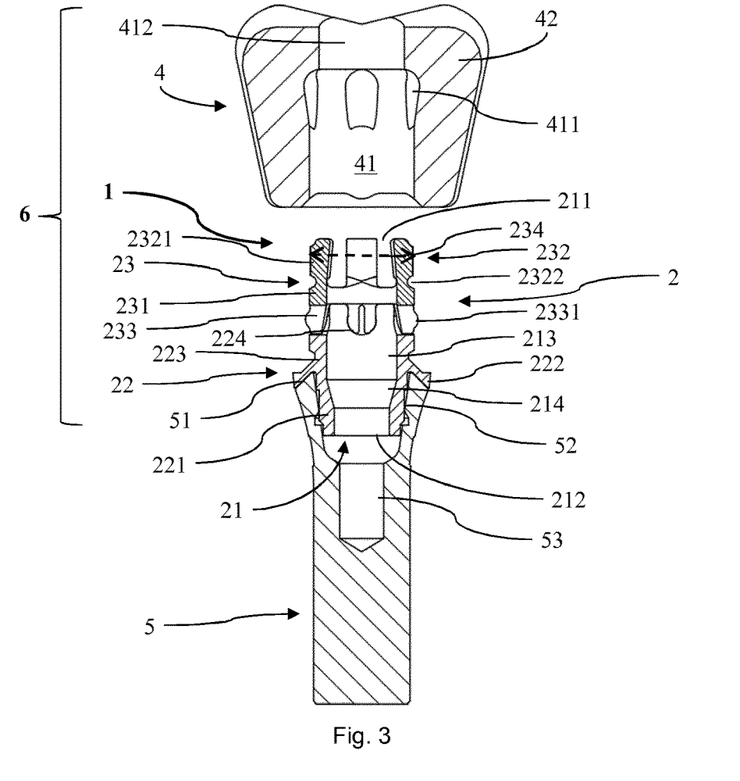
FIG. 3 shows a cross sectional view of an embodiment of a dental restoration assembly according to the invention comprising the abutment arrangement of the post body shown in FIG. 1.

FIG. 3 shows an embodiment of a dental restoration assembly 6 comprising the abutment arrangement 1 of the previous Figs. and a crown 4 as dental restoration. The crown 4 has a ceramic crown body 42 with a cavity 41 which is completely open in a downward direction and which has an upwardly extending axial screw access channel 412. The cavity 41 further has an impression 411 which forms a concave section in the crown body 42.

The post body 2 of the abutment arrangement 1 of the dental restoration assembly 6 is arranged on a dental implant 5. A top end of the implant 5 forms a occlusal end side 51. The implant 5 further has an upper abutment recess 52 passing over into a lower screw recess 53. The post body 2 is positioned in the abutment recess 52 such that the apical cylinder 221 of the base part 22 lies inside the abutment recess 52. Thereby, the abutment recess 52 is shaped to fit the outer surface of the apical cylinder 221 such that the post body 2 cannot be rotated with respect to the implant 5. The flange portion 222 of the base part 22 abuts the occlusal end side 51 of the implant 5.

As can be seen in the cross sectional view of FIG. 3 the lamellas 232 of the expansion part 23 are slightly bent in an inward direction. Like this, the bulges 2321 do not laterally project over the rest of the post body 2. The outer diameter 234 of the expansion part 23 is not increased since no lateral force is applied and the expansion part 23 is in its unexpanded state. The protrusions 2331 do slightly extend over the rest of the post body 2 in a lateral or radial direction.

Figure 4:
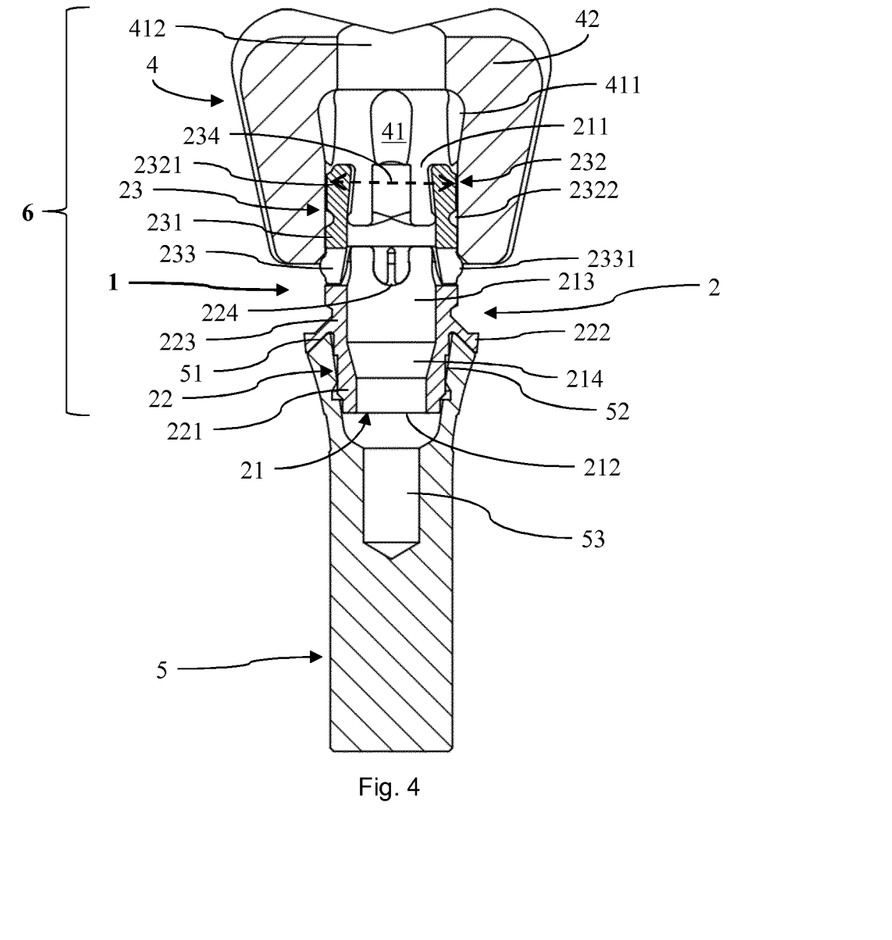
FIG. 4 shows a cross sectional view of the dental restoration assembly of FIG. 3 while a crown being shifted on the post body.

For connecting the crown 4 to the implant 5 in an embodiment of the method according to the invention the post body 2 or more precisely the portion of it above the flange portion 222 is imposed into the cavity 41 of the crown as shown in FIG. 3, FIG. 4, FIG. 5 and FIG. 6. As can be seen in FIG. 3 the post body 2 is set onto the implant 5. Then, as can be seen in FIG. 4 the crown 4 shifted onto the post body 2 such that the expansion part 23 is axially inserted into the cavity 41. Thereby, the cavity 41 is dimensioned such that the expansion part 23 can easily enter the cavity 41 up to the protrusions 2331 of the snap-in tongues 233.

Figure 5:
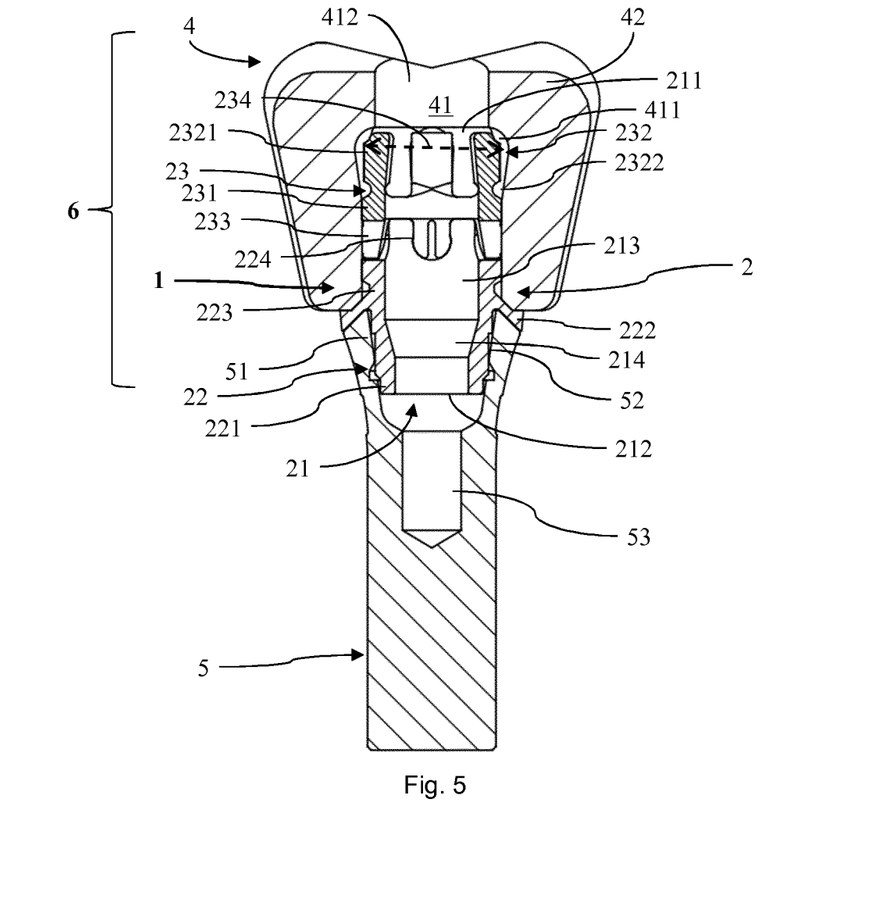
FIG. 5 shows a cross sectional view of the dental restoration assembly of FIG. 3 when the crown is set on the post body.

As can be seen in FIG. 5 the crown 4 is the further pushed onto the post body 2 until the crown body 42 abuts the flange portion 222. Thereby, the protrusions 2331 are pressed inwardly such that the expansion part 23 is slightly deformed. Due to the elasticity of the PEEK material the crown 4 is, thus, clamped and releasably held on the post body 2.

Figure 6:
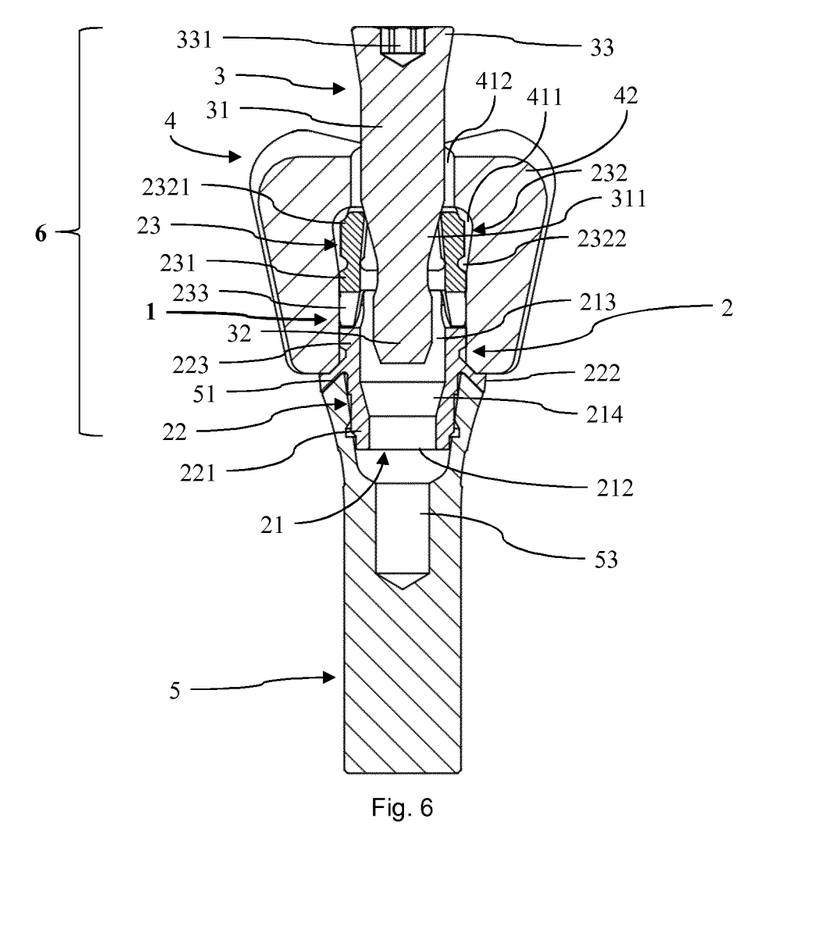
FIG. 6 shows a cross sectional view of the dental restoration assembly of FIG. 3 while a screw element is entering the crown and the post body.
Figure 7:
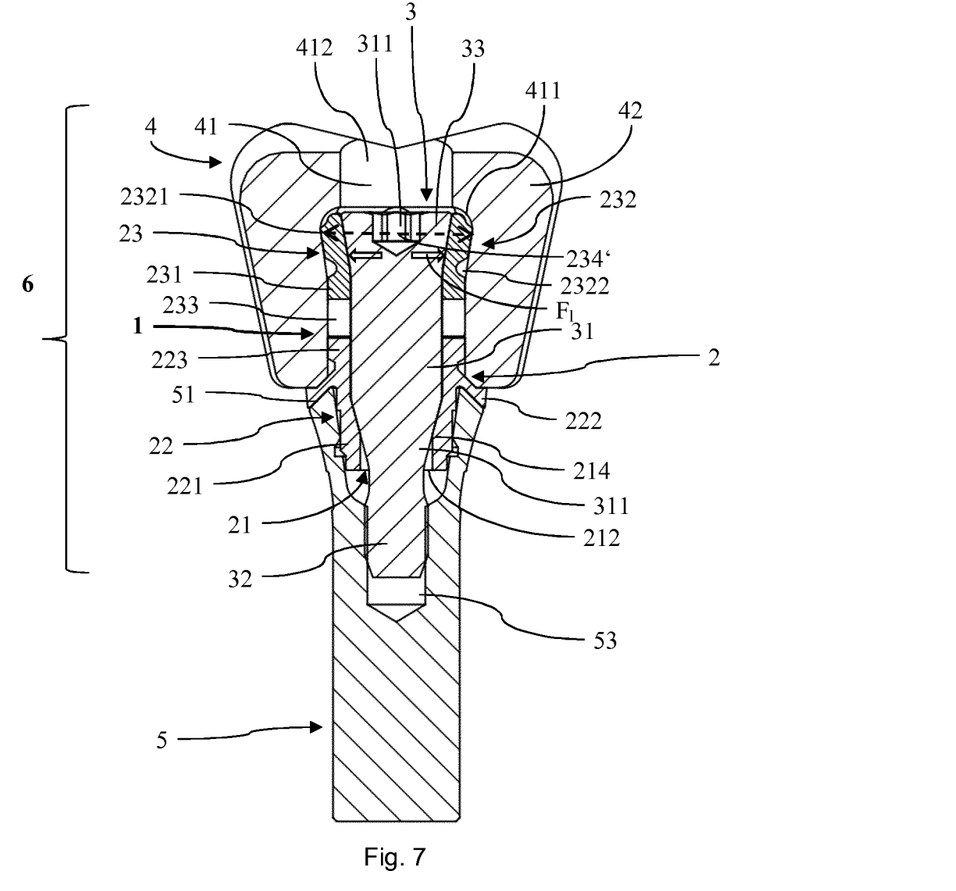
FIG. 7 shows a cross sectional view of the dental restoration assembly of FIG. 3 when being fixed on an implant.

As can be seen in FIG. 6 the screw element 3 is then entered top down via the screw access channel 412 of the crown 4 into the passage 21 of the post body 2. As shown in FIG. 7 the thread section 32 of the screw element 3 is then screwed into the screw recess 53 of the implant 5 for securing the screw element 3 to the implant 5. In particular, the thread of the outer thread section 32 engages the inner thread of the screw recess 53. Thereby, the push portion 311 of the head section 31 of the screw element 3 abuts the press section 214 of the passage 21 of the post body 2 such that the post body 2 is pressed and secured to the implant 5.

In the meantime, the expanding section 33 of the screw element 3 provides a force having a lateral component $F_1$ onto the pressure receiving section 215 of the passage 21 and of the expansion part 23. Like this, the outer diameter 234' of the expansion part 23 is increased and the bulges 2321 of the lamellas 232 are moved into the impression 411 of the cavity 41 of the crown 4. Thus, the crown 4 is fixedly connected to the post body 2 and indirectly to the implant 5. The screw access channel 412 of the crown 4 is the closed, e.g., by a plug in order to prevent that material can be accumulated in the screw access channel 412.

This description and the accompanying drawings that illustrate aspects and embodiments of the present invention should not be taken as limiting—the claims defining the protected invention. In other words, while the invention has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope and spirit of the following claims. In particular, the present invention covers further embodiments with any combination of features from different embodiments described above and below.

The disclosure also covers all further features shown in the Figs. individually although they may not have been described in the afore or following description. Also, single alternatives of the embodiments described in the figures and the description and single alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word "comprising" does not exclude other elements or steps, and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage. The terms "essentially", "about", "approximately" and the like in connection with an attribute or a value particularly also define exactly the attribute or exactly the value, respectively. The term "about" in the context of a given numerate value or range refers to a value or range that is, e.g., within 20%, within 10%, within 5%, or within 2% of the given value or range. Components described as coupled or connected may be electrically or mechanically directly coupled, or they may be indirectly coupled via one or more intermediate components. Any reference signs in the claims should not be construed as limiting the scope.

The invention claimed is:

1. An abutment arrangement for connecting a dental restoration to a dental implant comprising:
   a post body; and
   a screw element, wherein
      the post body has an axial passage with an apical aperture and an occlusal aperture,
      the axial passage of the post body is equipped with a head slot and a press section limiting the head slot,
      the screw element comprises a head section and a thread section axially distant from the head section, and
      the screw element is arrangeable in the axial passage of the post body such that the head section of the screw element is positioned in the head slot of the axial passage of the post body abutting the press section of the axial passage of the post body,
      the screw element extends through the occlusal aperture of the axial passage of the post body out of the post body,
      the post body has an expansion part and the screw element comprises a spreading section,
      the axial passage extends through the expansion part of the post body,
      an outer diameter of the expansion part of the post body is elastically increasable by applying a lateral force,
      the axial passage of the post body has a pressure receiving section at the expansion part, wherein the pressure receiving section of the axial passage of the post body is separate and axially distant from the press section of the axial passage of the post body, and
      when the screw element is located in the axial passage of the post body, the spreading section of the screw element is arrangeable at the pressure receiving section of the axial passage of the post body such that the lateral force is applied to the expansion part of the post body and the outer diameter of the expansion part of the post body is increased.

2. The abutment arrangement according to claim 1, wherein the expansion part of the post body comprises flexible lamellas.

3. The abutment arrangement according to claim 2, wherein the expansion part of the post body comprises blind sections arranged between the flexible lamellas.

4. The abutment arrangement according to claim 1, wherein the head section of the screw element has a push portion abutting the press section of the passage of the post body when the screw element is arranged in the axial passage of the post body.

5. The abutment arrangement according to claim 4, wherein the push portion of the head section of the screw element is separate and axially distant from the spreading section of the screw element.

6. The abutment arrangement according to claim 4, wherein the push portion is conical tapering towards the thread section of the screw element.

7. The abutment arrangement according to claim 6, wherein the press section of the axial passage of the post body is conical corresponding to the push portion of the head section of the of the screw element.

8. The abutment arrangement according to claim 1, wherein the spreading section of the screw element is conical and tapers towards the thread section of the screw element.

9. The abutment arrangement according to claim 8, wherein the pressure receiving section of the axial passage of the post body is conical corresponding to the spreading section of the screw element.

10. The abutment arrangement according to claim 1, wherein
the post body has a base part adjacent to the expansion part,
the passage extends through the base part of the post body,
the base part of the post body is made of a first material having properties adjusted for an efficient connection of the post body to the dental implant, and
the expansion part of the post body is made of a second material having properties adjusted for an efficient connection of the post body to the dental restoration.

11. The abutment arrangement according to claim 10, wherein the first material of the base part of the post body is titanium and/or the second material of the expansion part of the post body is PEEK, PMMA, Polycarbonate, Nylon, Silicone or a combination thereof.

12. The abutment arrangement according to claim 10, wherein the base part has a first connection structure and the expansion part has a second connection structure, wherein the post body is assembled by the first connection structure of the base part engaging the second connection structure of the expansion part.

13. The abutment arrangement according to claim 12, wherein the first connection structure of the base part is a first snap-in formation and the second connection structure of the expansion part is a second snap-in formation corresponding to the first snap-in formation of the base part.

14. The abutment arrangement according to claim 1, wherein the post body comprises a protrusion element dimensioned to releasably hold the dental restoration when being arranged onto the post body.

15. The abutment arrangement according to claim 14, wherein the protrusion element is formed at the expansion part of the post body.

16. A dental restoration assembly comprising:
an abutment arrangement according to claim 1; and
a dental restoration having a cavity for receiving the post body of the abutment arrangement, wherein the cavity of the dental restoration is formed to allow the screw element of the abutment arrangement to increase the outer diameter of the expansion part of the post body such that the dental restoration is fixedly connected to the post body of the abutment arrangement.

17. The dental restoration assembly according to claim 16, wherein the cavity of the dental restoration has a concave impression into which the expansion part of the post body is expandable and which prevents moving the dental restoration in relation to the post body of the abutment arrangement when the outer diameter of the expansion part of the post body is increased by the screw element of the abutment arrangement.

18. A method of connecting a dental restoration to a dental implant comprising:
obtaining an abutment arrangement according to claim 1;
providing the dental restoration with a cavity formed to allow the screw element of the abutment arrangement to increase the outer diameter of the expansion part of the post body;
imposing the post body of the abutment arrangement into the cavity of the dental restoration;
setting the post body onto the dental implant;
providing the screw element of the abutment arrangement through the cavity of the dental restoration and the passage of the post body of the abutment arrangement;
securing the screw element to the dental implant, whereby
the head section of the screw element of the abutment arrangement abuts the press section of the passage of the post body of the abutment arrangement such that the post body of the abutment arrangement is pressed to the dental implant, and
the spreading section of the screw element of the abutment arrangement provides a lateral force onto the expansion part of the post body of the abutment arrangement such that the outer diameter of the expansion part of the post body of the abutment arrangement is increased and the dental restoration is fixedly connected the post body of the abutment arrangement; and
closing an occlusal opening of the cavity of the dental restoration.

* * * * *